US012123173B1

(12) United States Patent
Koot

(10) Patent No.: US 12,123,173 B1
(45) Date of Patent: Oct. 22, 2024

(54) HYDRAULIC SYSTEM FOR BATTERY-POWERED UTILITY VEHICLES

(71) Applicant: Vermeer Manufacturing Company, Pella, IA (US)

(72) Inventor: Boris Koot, Budel (NL)

(73) Assignee: Vermeer Manufacturing Company, Pella, IA (US)

( * ) Notice: Subject to any disclaimer, the term of this patent is extended or adjusted under 35 U.S.C. 154(b) by 461 days.

(21) Appl. No.: 17/371,545

(22) Filed: Jul. 9, 2021

(51) Int. Cl.
*E02F 9/22* (2006.01)
*F15B 15/18* (2006.01)
*E02F 3/34* (2006.01)
*E02F 9/20* (2006.01)

(52) U.S. Cl.
CPC .......... *E02F 9/2228* (2013.01); *E02F 9/2203* (2013.01); *E02F 9/2267* (2013.01); *E02F 9/2271* (2013.01); *E02F 9/2285* (2013.01); *F15B 15/18* (2013.01); *E02F 3/3414* (2013.01); *E02F 9/2004* (2013.01); *F15B 2211/427* (2013.01)

(58) Field of Classification Search
CPC .... F15B 11/162; F15B 11/165; F15B 13/022; F15B 2211/20515; F15B 2211/427
See application file for complete search history.

(56) References Cited

U.S. PATENT DOCUMENTS 6,989,640 B2 * 1/2006 Yoshimatsu .......... E02F 9/2292 318/140
9,084,388 B2 * 7/2015 Bitter .................... F15B 11/162
9,422,052 B2 * 8/2016 Kondo .................. B64C 13/505
10,280,592 B2 5/2019 Takahashi et al.
10,472,805 B1 11/2019 Kumeuchi et al.
10,533,304 B2 * 1/2020 Rannow ................ E02F 9/2221
10,815,647 B2 * 10/2020 Chioccola ............. E02F 9/2235
2005/0001567 A1 * 1/2005 Yoshimatsu ............ F04B 23/06 318/34
2007/0062075 A1 * 3/2007 Graham ................. G05G 9/047 37/234

(Continued)

FOREIGN PATENT DOCUMENTS

EP 2775150 A1 9/2014
JP 2004350443 A 12/2004

(Continued)

*Primary Examiner* — Thomas E Lazo
(74) *Attorney, Agent, or Firm* — Michael Best & Friedrich LLP

(57) ABSTRACT

A hydraulic system includes a pump to pressurize and output hydraulic fluid, an electric motor selectively driving the pump, and a controller to selectively control a target speed of the electric motor based on input from an operator control. A proportional directional control valve is in the load circuit and communicates with the pump and the controller. The proportional directional control valve controls a flow of hydraulic fluid to a hydraulic actuator associated with the load circuit such that the flow of hydraulic fluid to the hydraulic actuator is proportional to a signal provided by the controller. The signal is a function of the input from the operator control. Flow of hydraulic fluid to the hydraulic actuator through the proportional directional control valve is varied by the controller making a) variations of the target speed of the motor, and b) variations of the signal to the proportional directional control valve.

19 Claims, 6 Drawing Sheets

(56) References Cited

U.S. PATENT DOCUMENTS

| | | | | |
|---|---|---|---|---|
| 2011/0056194 | A1* | 3/2011 | Wojcicki | F15B 11/17 60/486 |
| 2016/0244308 | A1* | 8/2016 | Thomas | B66F 9/06 |
| 2019/0136490 | A1* | 5/2019 | Chioccola | E02F 9/2225 |
| 2019/0194910 | A1* | 6/2019 | Takahashi | E02F 9/22 |

FOREIGN PATENT DOCUMENTS

| | | | |
|---|---|---|---|
| JP | 2008256037 | A * | 10/2008 |
| JP | 2013100864 | A | 5/2013 |
| KR | 101350148 | B1 | 1/2014 |
| WO | 2014095240 | A1 | 6/2014 |
| WO | 2021029940 | A1 | 2/2021 |

* cited by examiner

HYDRAULIC SYSTEM FOR BATTERY-POWERED UTILITY VEHICLES

BACKGROUND

The present invention relates to battery-powered utility vehicles, for example stand-on loaders, excavators, skid-loaders, forklifts, and the like, and more particularly to hydraulic systems used with such vehicles.

SUMMARY

In one aspect, the invention provides a hydraulic system configured to provide a variable flow of hydraulic fluid to a first load circuit and a second load circuit. The hydraulic system includes a pump configured to pressurize and output hydraulic fluid, an electric motor selectively driving the pump, and a controller configured to selectively control a target speed of the electric motor based on input from an operator control. A first proportional directional control valve is in the first load circuit and communicates with the pump and the controller. The first proportional directional control valve controls a flow of hydraulic fluid to a first hydraulic actuator associated with the first load circuit such that the flow of hydraulic fluid to the first hydraulic actuator is proportional to a first signal provided by the controller. The first signal is a function of the input from the operator control. A second proportional directional control valve is in the second load circuit and communicates with the pump and the controller. The second proportional directional control valve controls a flow of hydraulic fluid to a second hydraulic actuator associated with the second load circuit such that the flow of hydraulic fluid to the second hydraulic actuator is proportional to a second signal provided by the controller. The second signal is a function of the input from the operator control.

In another aspect, the invention provides a hydraulic system configured to provide a variable flow of hydraulic fluid to a load circuit. The hydraulic system includes a pump configured to pressurize and output hydraulic fluid, an electric motor selectively driving the pump, and a controller configured to selectively control a target speed of the electric motor based on input from an operator control. A proportional directional control valve is in the load circuit and communicates with the pump and the controller. The proportional directional control valve controls a flow of hydraulic fluid to a hydraulic actuator associated with the load circuit such that the flow of hydraulic fluid to the hydraulic actuator is proportional to a signal provided by the controller. The signal is a function of the input from the operator control. Flow of hydraulic fluid to the hydraulic actuator through the proportional directional control valve is varied by the controller making a) variations of the target speed of the motor, and b) variations of the signal to the proportional directional control valve.

In yet another aspect, the invention provides a stand-on loader including a frame, the frame supporting a platform configured to support an operator of the loader, a boom configured to raise or lower a load; and a bucket coupled to the boom for supporting the load. The loader further includes a hydraulic system configured to provide a variable flow of hydraulic fluid to a boom raise/lower circuit and a bucket tilt circuit. The hydraulic system includes a pump configured to pressurize and output hydraulic fluid, an electric motor selectively driving the pump, and a controller configured to selectively control a target speed of the electric motor based on input from an operator control. A first proportional directional control valve is in the boom raise/lower circuit and communicates with the pump and the controller. The first proportional directional control valve controls a flow of hydraulic fluid to a first hydraulic cylinder associated with the boom such that the flow of hydraulic fluid to the first hydraulic cylinder is proportional to a first signal provided by the controller. The first signal is a function of the input from the operator control associated with raising or lowering the boom. A second proportional directional control valve is in the bucket tilt circuit and communicates with the pump and the controller. The second proportional directional control valve controls a flow of hydraulic fluid to a second hydraulic cylinder associated with the bucket such that the flow of hydraulic fluid to the second hydraulic cylinder is proportional to a second signal provided by the controller. The second signal being a function of the input from the operator control associated with tilting the bucket. The pump and the electric motor are positioned adjacent to the platform, and control of the target speed of the electric motor by the controller is open-loop control in which the target speed of the motor is proportional to a magnitude of the input from the operator control regardless of a pressure generated by the pump.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

FIGS. 1-4 illustrate a utility vehicle 10 according to one embodiment. The illustrated vehicle 10 is an electric-powered, stand-on loader, however other types of electric-powered utility vehicles, such as excavators, skid-loaders, forklifts, and the like are also contemplated. The vehicle 10 includes a frame 14 that includes a platform 18 (see FIG. 3) on which the operator stands when operating the vehicle 10. Wheels 22 are driven by four battery-powered electric drive motors (not shown), with the control of these drive motors managed by a main vehicle controller. While the vehicle is shown with wheels 22, it is to be understood that other methods of motive movement, such as tracks, can also be used. Furthermore, mobility may not be desirable in all cases, and stationary embodiments without driven wheels are also contemplated. An example may include non-driven wheels and a hitch to allow travel and transport of a utility cart having the functionality described below.

Figure 5:
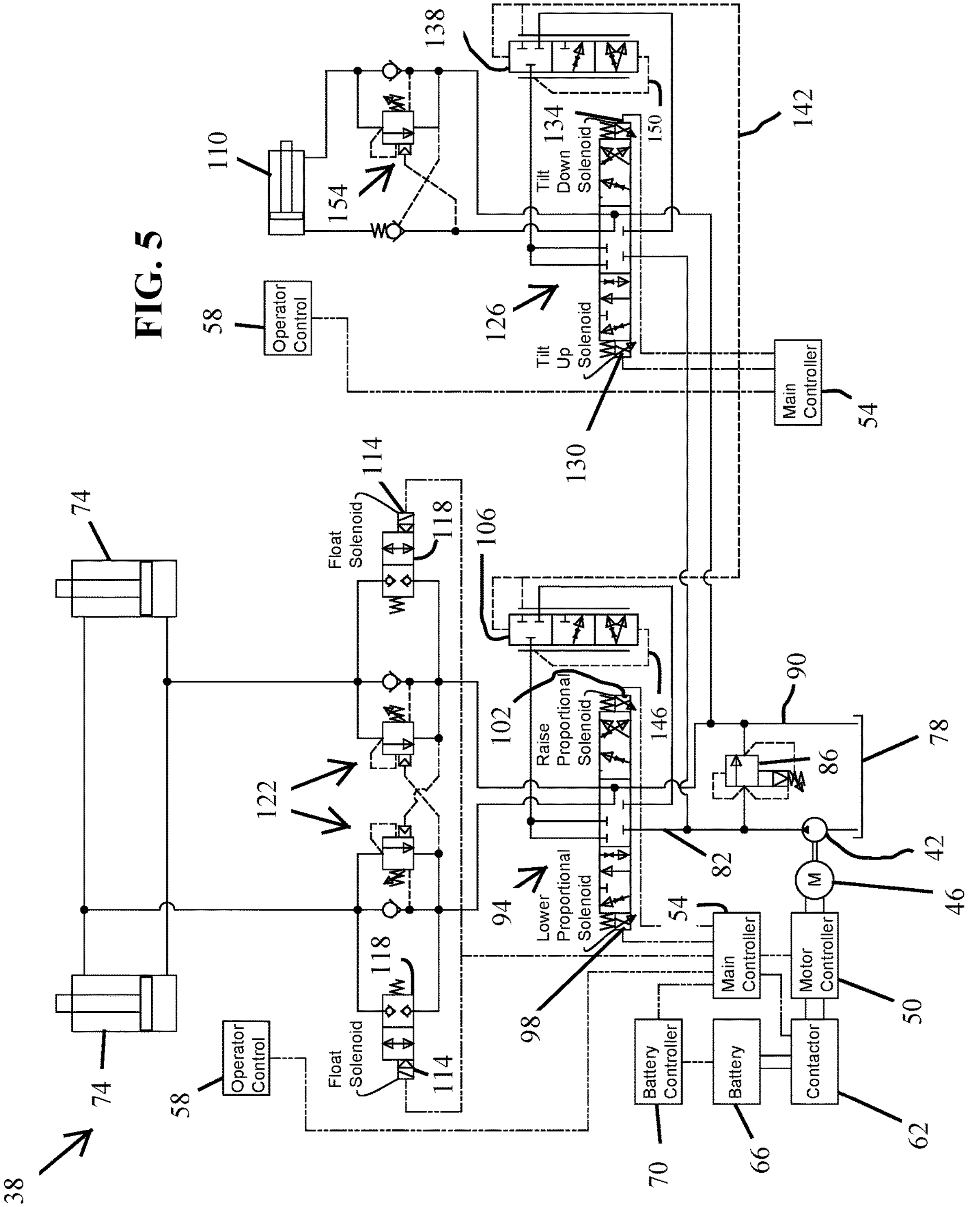
FIG. 5 is a schematic view of the hydraulic system used to control the boom and bucket of the utility vehicle of FIG. 1.

The utility vehicle 10 further includes a lift system 26 including a bucket 30 supported by a boom 34. The bucket 30 can be raised and lowered by movement of the boom 34, and can also be tilted for dumping or carrying. An electric-powered hydraulic system 38 is schematically illustrated in FIG. 5 and controls the raise/lower and tilt functionalities of the lift system 26. The illustrated electric-powered hydraulic system 38 includes a fixed displacement pump 42 that is powered by a variable speed electric motor 46 having its own motor controller 50. In other embodiments, a variable displacement pump could be used. A main controller 54, which can be the main vehicle controller or an auxiliary controller separate from the main vehicle controller, controls the operation of the lift system 26 and the hydraulic system 38 by coordinating input from operator controls 58 with the corresponding desired physical output/actions at the bucket 30 and boom 34, as will be described in further detail below.

The main controller 54 is a microprocessor-based controller having hardware systems for accepting electrical input signals (e.g., from the operator controls 58), hardware systems for driving electrical outputs, and hardware systems for two-way communications. The main controller 54 may include one or more electronic processors and one or more memory devices. The controller 54 may be communicably connected to one or more sensors or other inputs, such as described herein. The electronic processor may be implemented as a programmable microprocessor, an application specific integrated circuit (ASIC), one or more field programmable gate arrays (FPGA), a group of processing components, or with other suitable electronic processing components. The memory device (for example, a non-transitory, computer-readable medium) includes one or more devices (for example, RAM, ROM, flash memory, hard disk storage, etc.) for storing data and/or computer code for completing the or facilitating the various processes, methods, layers, and/or modules described herein. The memory device may include database components, object code components, script components, or other types of code and information for supporting the various activities and information structure described in the present application. According to one example, the memory device is communicably connected to the electronic processor and may include computer code for executing one or more processes described herein. The controller 54 may further include an input-output ("I/O") module. The I/O module may be configured to interface directly with one or more devices, such as a power supply, sensors, displays, etc. In one embodiment, the I/O module may utilize general purpose I/O (GPIO) ports, analog inputs/outputs, digital inputs/outputs, and the like.

While FIG. 5 schematically illustrates the main controller 54 in two places, this is done for clarity in the figure only, and it should be understood that there is only one main controller 54 used on the vehicle 10. The use of the same reference numeral 54 in two instances in FIG. 5 indicates that there is only one main controller 54 in the system 38.

The operator controls 58 provide the input from the operator for the desired action to be taken by the lift system 26 (as well as other inputs for other vehicle actions not discussed herein). These controls can take any suitable form (e.g., buttons, switches, levers, joysticks, dials, knobs, wheels, handlebars, combinations thereof, and the like). In the illustrated embodiment, a transducer converts the position of one or more control levers for the lift system 26 into respective electrical signals. For example, when a control lever is in a neutral/centered position, the transducer will generate a predetermined voltage signal indicative of the neutral/centered position. The voltage signal will then change when the lever is moved out of its neutral/centered position to provide the desired signal(s) to the main controller 54. Additional inputs, such as a main on/off control are also provided on the operator controls 58. Only when the main on/off control is in the on position will the main controller 54 activate the contactor 62 to permit the battery 66 and its battery controller 70 to power the motor controller 50 and the motor 46. FIG. 5 illustrates schematically the two-way communication lines between the battery controller 70 and the main controller 54, the contactor 62 and the main controller 54, the battery 66 and the battery controller 70, and between the motor controller 50 and the main controller 54. While separate connections are illustrated, it is to be understood that these components could be connected for communication in series, in a communication ring, or within a communication network.

Figure 1:
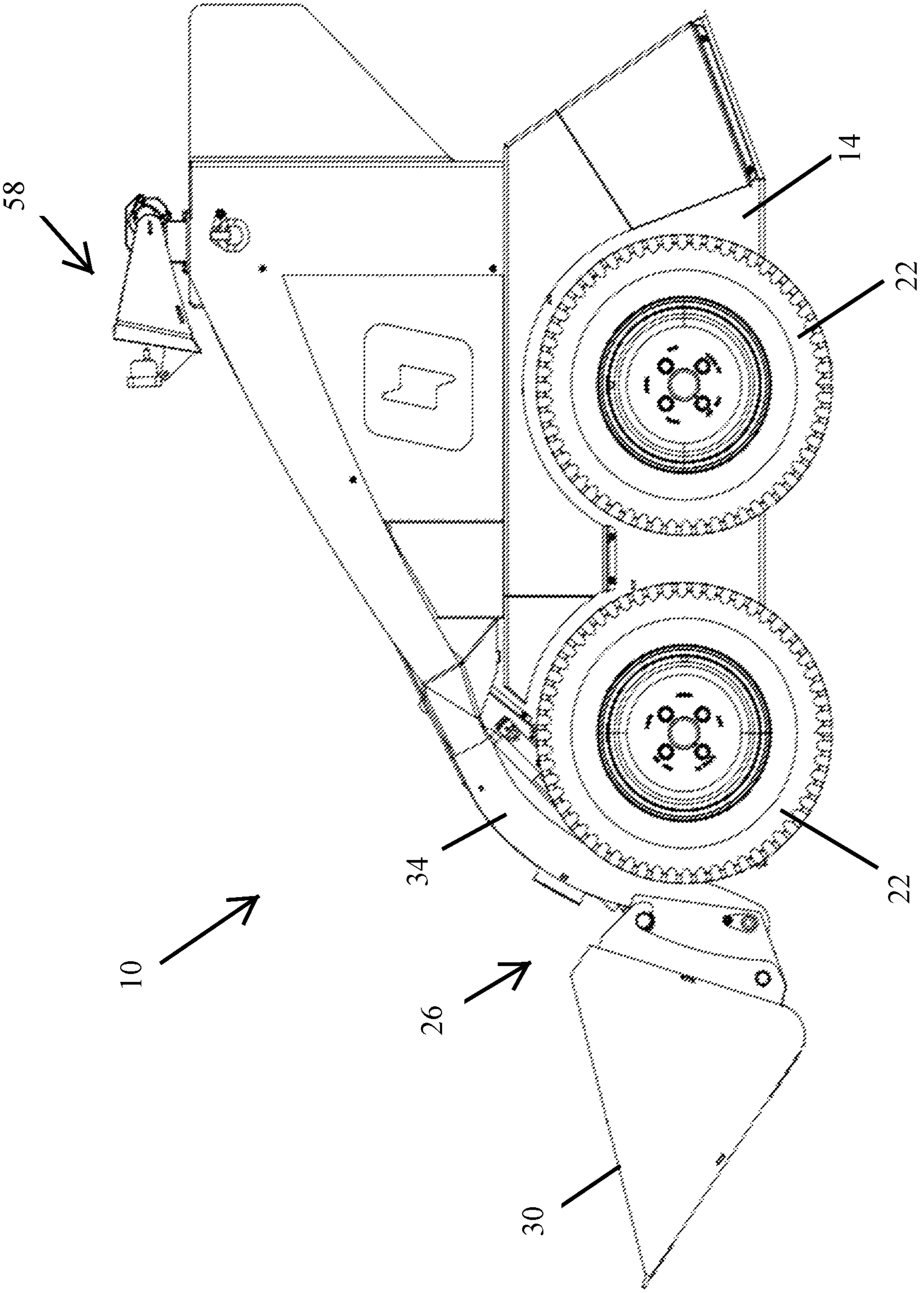
FIG. 1 is a side view of a utility vehicle according to one embodiment of the present disclosure, showing a boom with a bucket in a lowered position with the bucket tilted in a load-carrying position.
Figure 2:
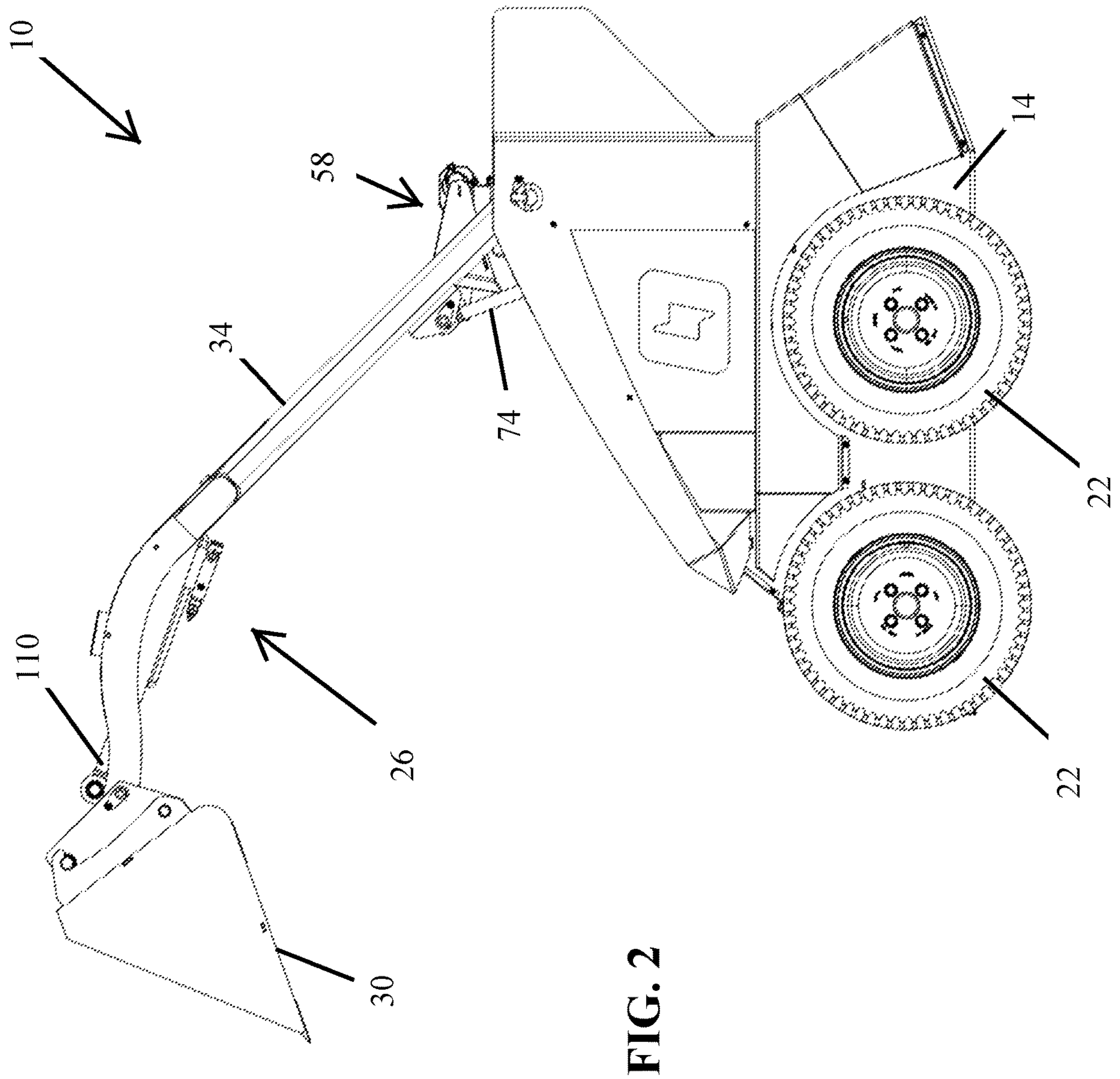
FIG. 2 is another side view of the utility vehicle of FIG. 1, showing the boom and bucket in a raised position with the bucket tilted in a dumping position.
Figure 3:
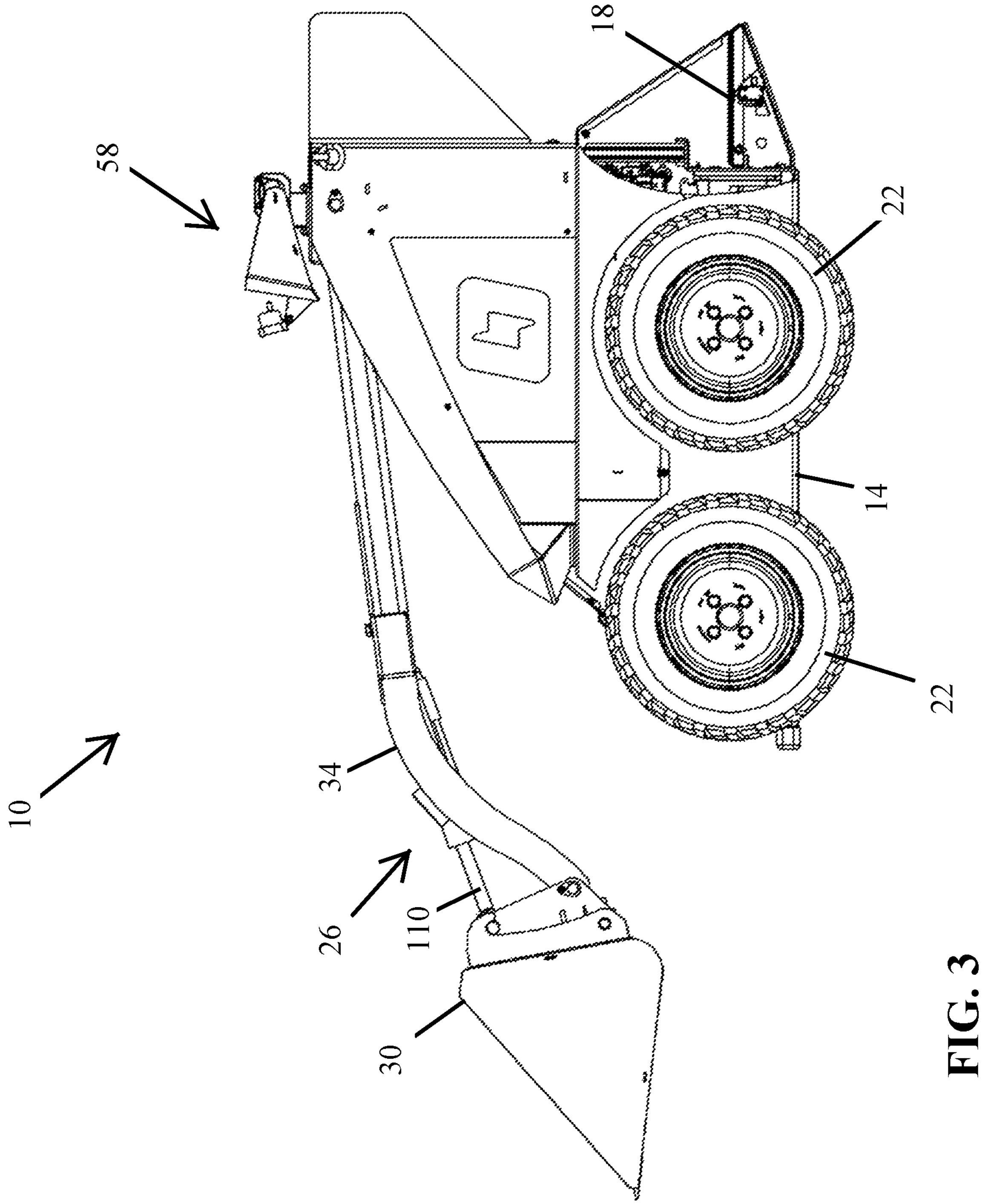
FIG. 3 is a side view of the utility vehicle of FIG. 1, partially cut-away to show the operator standing platform.
Figure 4:
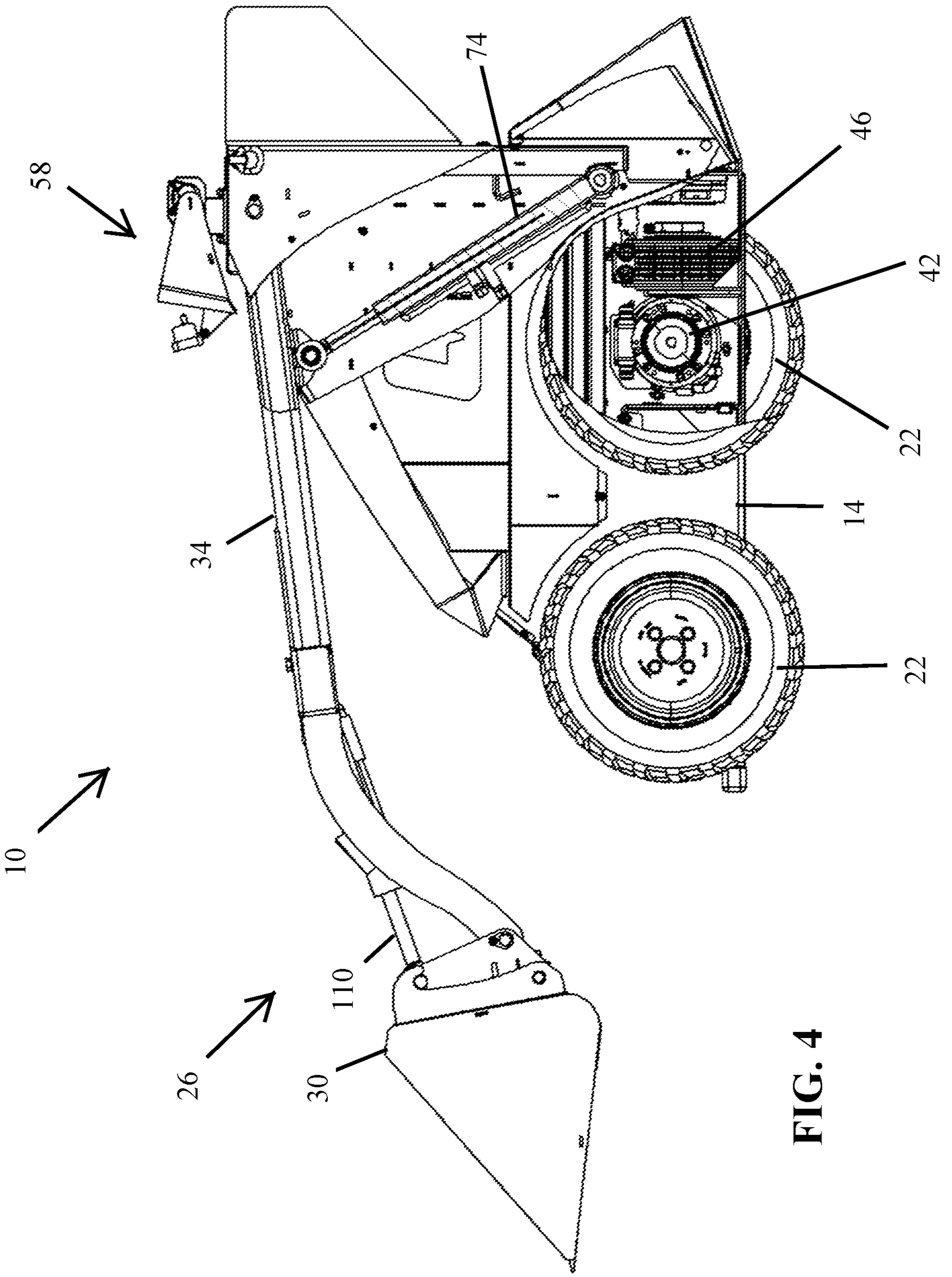
FIG. 4 is another side view of the utility vehicle of FIG. 1, partially cut-away to show the locations of the electric motor and hydraulic pump that operate the boom and bucket, and the location of the hydraulic lift cylinder.

With reference to FIGS. 2, 4, and 5, the illustrated lift system 26 includes two hydraulic actuators 74 (e.g., hydraulic cylinders) that drive raising or lowering of the boom 34. Only one hydraulic cylinder 74 is shown in FIGS. 2 and 4. Referring to FIG. 5, the hydraulic cylinders 74 are connected in the hydraulic circuit to be driven by pressurized hydraulic fluid provided by the hydraulic pump 42. In other embodiments, the hydraulic actuators could be one or more hydraulic motors (e.g., configured to operate a rack-and-pinion arrangement for raising/lowering the boom 34).

The portion of the hydraulic system 38 associated with the raising/lowering functionality of the boom 34 (i.e., the raise/lowering hydraulic circuit or the first load circuit) will now be described with respect to FIG. 5. Hydraulic fluid is provided in a tank 78. The tank 78 supplies hydraulic fluid to the pump 42, which then outputs pressured fluid in line 82 to the remainder of the hydraulic system 38. A pressure relief valve 86 is provided in the output line 82 to allow pressurized fluid to return to the tank 78 through return line 90. For example, if the hydraulic cylinders 74 hit the end of their strokes, pressurized fluid will flow through the pressure relief valve 86 and back to the tank 78.

The hydraulic system 38 further includes a raise/lower proportional directional flow control valve 94 communicating with output and return lines 82, 90. The raise/lower directional flow control valve 94 is a proportional spool valve that is operated to shift between the three illustrated positions by a lower proportional solenoid 98 and a raise proportional solenoid 102. More specifically, when the main controller 54 observes the predetermined neutral/centered position input signal from the operator controls 58 associated with the raise/lower functionality (e.g., the control lever is in the neutral/centered position), neither proportional solenoid 98, 102 is actuated, and thus, the valve 94 remains in the centered position shown in FIG. 5. In this position, no flow between the output and return lines 82, 90 to the remainder of the hydraulic circuit can occur. Furthermore, a signal being sent to the motor controller 50 is for zero motor speed, and therefore the motor 46 is not driving the pump 42 to pressurize any hydraulic fluid. Thus, there can be no raising or lowering of the boom 34.

When the operator moves the operator controls 58 out of the neutral/centered position for a desired raising or lowering operation, the corresponding signal is sent to the main controller 54 and the logic programming of the main controller 54 controls the output signals to the proportional solenoids 98, 102. The signals to the solenoids 98, 102 will be variable, such as a variable voltage or variable resistance. The magnitude of the signal will vary as a function of how far the operator moves the control away from the neutral/centered position. The control can be moved in a first direction to control lowering of the boom 34 and can be moved in an opposite second direction to control raising of the boom 34.

When the main controller 54 receives this input signal from the operator control 58, it will first send a signal to the motor controller 50 to drive the motor 46 to rotate the pump 42 at a target speed that is a function of the magnitude of the input signal received from the operator control 58. In other words, the further the operator moves the control lever away from the neutral/centered position, the faster the target speed for the motor 46, and hence the faster the rotation of the pump 42. This control is open-loop in regards to the control signal from the main controller 54 to the motor controller 50 because the target speed of the motor 46 is set as a function of the operator control signal regardless of a pressure generated by the pump 42.

This open-loop control system for controlling the motor 46 and pump 42 is not an obvious solution. Commonly a closed-loop control system would be used, in which hydraulic pressure generated by the pump would be used as feedback so that the speed of the motor driving the pump could be reduced when an adequate pressure was generated. This closed-loop technique reduces the occurrences of when the motor drives the pump to generate excessive flow—more flow than is required for the demanded action. This closed-loop technique reduces parasitic loads, thereby improving efficiency. However, with the utility vehicle 10, the closed-loop control resulted in noticeable distracting noise from the resulting frequent speed variation of the motor 46 and pump 42. Notice in FIG. 4 that the pump 42 and motor 46 are located in very close proximity adjacent to the platform 18 on which the operator stands. This noise variation was not acceptable to the operator. It was therefore determined that an open-loop control system, in which a target motor and pump speed is set as a function of the position of the operator control 58, and in which the pressure generated by the pump is not a factor, should be used. The target speed is communicated to the motor controller 50, which ultimately controls the motor 46.

The motor controller 50 will receive this target signal and appropriately control the voltage/current provided to the permanent magnet AC motor 46 to achieve the desired target speed. The motor controller 50 will receive feedback from the motor 46, thereby forming a closed-loop control of the motor speed by the motor controller 50, enabling the motor controller 50 to adjust the electric current provided to the motor 46 to maintain the target speed even as load on the motor 46 varies. This system thereby reduces noise fluctuations at the motor 46, improving the operating experience for the user.

The main controller 54 will also send a signal to the appropriate proportional solenoid 98, 102 so that pressurized hydraulic fluid will be properly directed by the flow control valve 94. Specifically, should the operator controls 58 indicate that a boom lowering action is desired, the main controller 54 will send the appropriate signal to the lower solenoid 98, thereby shifting the valve 94 proportionally to the right in the arrangement shown in FIG. 5. Similarly, should the operator controls 58 indicate that a boom raising action is desired, the main controller 54 will send the appropriate signal to the raise solenoid 102, thereby shifting the valve 94 proportionally to the left in the arrangement shown in FIG. 5. The signal sent to the appropriate proportional solenoid 98, 102 will also be a function of the magnitude of the signal sent from the operator control 58. This type of proportional signal is typically a varying voltage signal, using a pulse width modulation (PWM) that can be controlled to affect how far the spool valve 94 moves. The further the spool valve 94 moves, the less pressure drop through the valve 94 and the higher the flow rate of fluid that is allowed to pass-through the valve 94. The control of the raising or lowering speed is affected by both the speed of rotation of the pump 42, which is set by the target speed of the motor 46, and by how far the control valve 94 is opened, which is controlled by varying the PWM signal to either the lower proportional solenoid 98 or the raise proportional solenoid 102. The shifting of the valve 94 as described directs the flow of the pressurized hydraulic fluid to the hydraulic cylinders 74 to achieve the desired raising or lowering action of the boom 34.

The illustrated hydraulic system 38 can include additional components located between the directional control valve 94 and the hydraulic cylinders 74. For example, a priority valve 106 is shown communicating with the valve 94. As will be discussed in greater detail below, this priority valve 106 is operable to prioritize the flow of hydraulic fluid to the hydraulic cylinders 74 associated with the raise/lower functionality, and the flow of hydraulic fluid to the hydraulic cylinder 110 associated with the bucket tilt functionality. The priority valve 106 cooperates with the directional control valve 94 so that the appropriate amount of hydraulic fluid is ultimately output from the valve 94 to the cylinders 74.

The illustrated hydraulic system 38 further includes solenoids and valving operable to provide a float functionality for the boom 34 and bucket 30. The float functionality, when selected by the operator controls 58, allows the boom 34 and bucket 30 to float or follow the contours of the terrain. If the operator selects/activates the float functionality with the operator controls 58, appropriate signals are sent to associated float solenoids 114, which control respective float valves 118. These valves 118 selectively communicate with associated load holding valves 122 to provide the float functionality within the hydraulic system 38 for the hydraulic cylinders 74.

The portion of the hydraulic system 38 associated with the tilt functionality of the bucket 30 (i.e., the tilting hydraulic circuit or the second load circuit) will now be described with respect to FIG. 5. The hydraulic system 38 includes a tilt proportional directional flow control valve 126 communicating with the output and return lines 82, 90. The tilt directional flow control valve 126 is also a proportional spool valve that is operated to shift between the three illustrated positions by a tilt up proportional solenoid 130 and a tilt down proportional solenoid 134. More specifically, when the main controller 54 observes the predetermined neutral/centered position input signal from the operator controls 58 associated with the tilt functionality (e.g., the control lever is in the neutral/centered position), neither proportional solenoid 130, 134 is actuated, and thus, the valve 126 remains in the centered position shown in FIG. 5. In this position, no flow between the output and return lines 82, 90 to the remainder of the tilt control portion of the hydraulic circuit can occur. Furthermore, a signal being sent to the motor controller 50 is for zero motor speed, and therefore the motor 46 is not driving the pump 42 to pressurize any hydraulic fluid. Thus, there can be no tilting of the bucket 30.

When the operator moves the operator controls 58 out of the neutral/centered position for a desired bucket tilting operation, the corresponding signal is sent to the main controller 54 and the logic programming of the main controller 54 controls the output signals to the proportional solenoids 130, 134. The signals to the solenoids 130, 134 will be variable, such as a variable voltage or variable resistance. The magnitude of the signal will vary as a function of how far the operator moves the control away from the neutral/centered position. The control can be moved in a first direction to control tilt up of the bucket 30 and can be moved in an opposite second direction to control tilt down of the bucket 30.

When the main controller 54 receives this input signal from the operator control 58 for tilting, it will first send a signal to the motor controller 50 to drive the motor 46 to rotate the pump 42 at a target speed that is a function of the magnitude of the input signal received from the operator control 58. The main controller 54 will coordinate the target speed of the motor 46 based on both the input relating to bucket tilting and the input relating to boom raising/lowering. The logic could set the target speed as a maximum flow rate associated with the two separate controls, or as a combined target flow rate associated with the two separate controls. The motor control for the tilting functionality is the same open-loop control as that described above with respect to the raise/lower functionality and will not be described again.

When the operator controls 58 indicate that a bucket tilt up action is desired, the main controller 54 will send the appropriate signal to the tilt up solenoid 130, thereby shifting the valve 126 proportionally to the right in the arrangement shown in FIG. 5. Similarly, should the operator controls 58 indicate that a bucket tilt down action is desired, the main controller 54 will send the appropriate signal to the tilt down solenoid 134, thereby shifting the valve 126 proportionally to the left in the arrangement shown in FIG. 5. The signal sent to the appropriate proportional solenoid 130, 134 will also be a function of the magnitude of the signal sent from the operator control 58. This type of proportional signal is typically a varying voltage signal, using a pulse width modulation (PWM) that can be controlled to affect how far the spool valve 126 moves. The further the spool valve 126 moves, the less pressure drop through the valve 126 and the higher the flow rate of fluid that is allowed to pass-through the valve 126. The control of the bucket tilting speed is affected by both the speed of rotation of the pump 42, which is set by the target speed of the motor 46, and by how far the control valve 126 is opened, which is controlled by varying the PWM signal to either the tilt up proportional solenoid 130 or the tilt down proportional solenoid 134. The shifting of the valve 126 as described directs the flow of the pressurized hydraulic fluid to the hydraulic cylinder 110 to achieve the desired bucket tilting actions.

The illustrated hydraulic system 38 can include additional components located between the directional control valve 126 and the hydraulic cylinder 110. For example, a priority valve 138 is shown communicating with the valve 126. This priority valve 138 is operable to prioritize the flow of hydraulic fluid to the hydraulic cylinder 110 associated with the bucket tilt functionality, and the flow of hydraulic fluid to the hydraulic cylinders 74 associated with the boom raise/lower functionality. The priority valve 138 cooperates with the directional control valve 126 so that the appropriate amount of hydraulic fluid is ultimately output from the valve 126 to the cylinder 110.

The priority valve 138 associated with the bucket tilting functionality communicates with the priority valve 106 associated with the boom raise/lower functionality through a pilot pressure signal line 142. This signal line 142 communicates the pressure demands or load signal between the boom raise/lower portion of the hydraulic system 38 and the bucket tilting portion of the hydraulic system 38 to balance a bias of the priority valves 106 and 108 toward a maximum flow restriction position. Each priority valve 106, 138 further has its own respective pilot signal line 146, 150 biasing the respective valve 106, 138 toward a minimum flow restriction position based on the flow to the valves 94 and 126 generated by the pump 42. Together, the pilot pressure signal lines 142, 146, 150 cooperate to control how much hydraulic fluid will be output through each directional control valve 94, 126 based on the load demands on the hydraulic system 38. The two directional control valves 94, 126 provide the ability to separately control the speed and direction of movement of the boom raise/lower system and the bucket tilting system. The priority valves 106, 138 coordinate the flow so that separate, independent control capabilities for raise/lower and tilt functionalities are provided.

Figure 6:
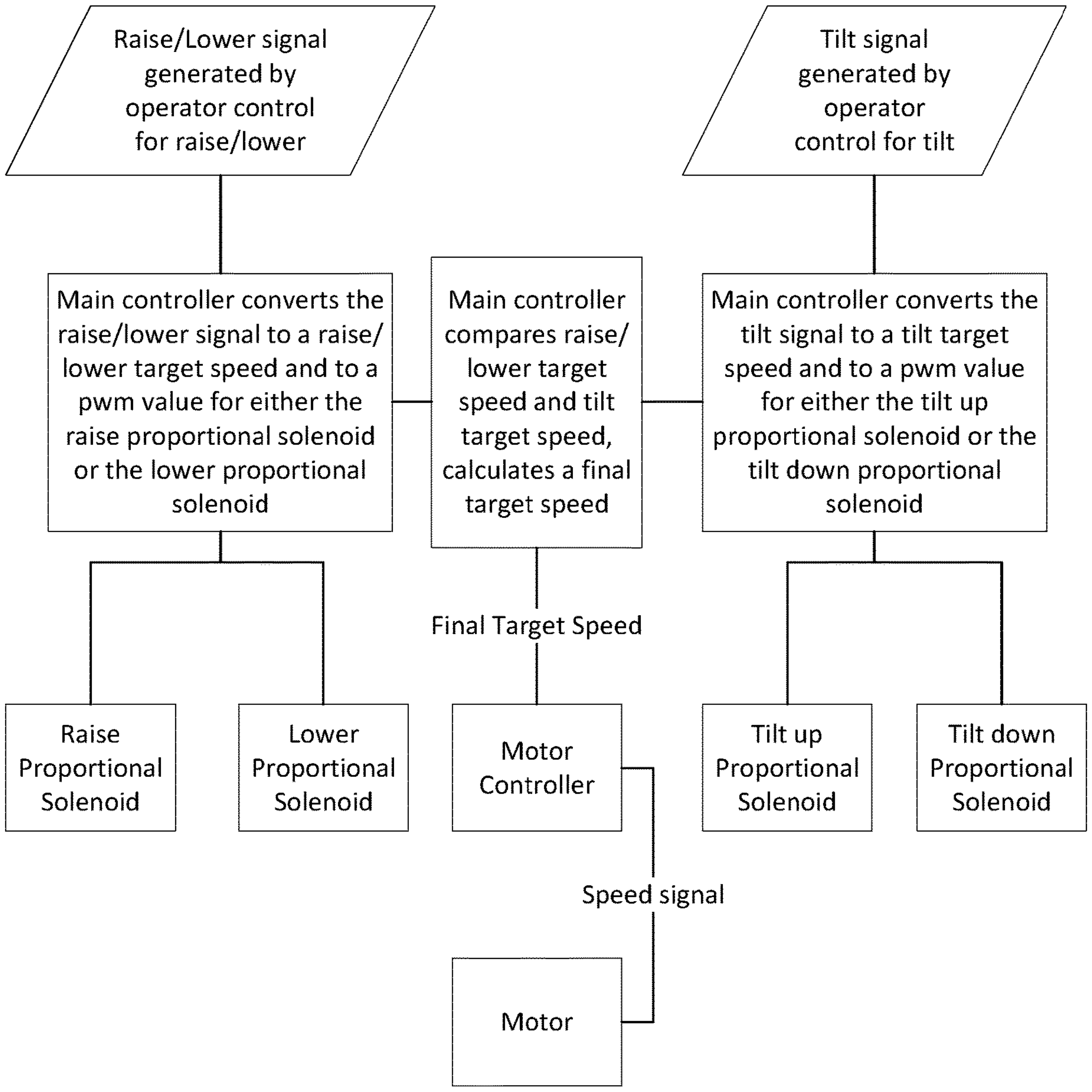
FIG. 6 is a control diagram depicting the control methodology associated with the lift system of the utility vehicle of FIG. 1.

For example, an operator could want to raise a load while at the same time tilt the bucket 30 down to maintain a level of the bucket 30. In this situation there may be a relatively high pressure necessary on a butt-end of the lift cylinder to raise the boom 34 by extending the lift cylinders 74. There could also be a very low pressure needed on the rod-end of the tilt cylinder 110. The two directional control valves 94, 126 provide the ability to separately control the speed and direction of movement of these separate systems. The capability for separate, independent control is provided by the system having separate controls sending signals to the main controller 54, and the main controller 54 sending separate signals to the appropriate proportional control solenoids 98, 102, 130, 134 in coordination with sending a target speed signal to the motor controller 50 to control the speed of the motor 46 and the speed of rotation of the pump 42. FIG. 6 depicts an exemplary control diagram illustrating this control methodology.

The illustrated hydraulic system 38 further includes a load holding valve 154 that holds the tilt angle of the bucket 30. No float functionality for bucket tilt is provided in the illustrated embodiment.

Although the invention has been described in detail with reference to certain preferred embodiments, variations and modifications exist within the scope and spirit of one or more independent aspects of the invention as described.

The invention claimed is:

1. A hydraulic system configured to provide a variable flow of hydraulic fluid to a first load circuit and a second load circuit, the hydraulic system comprising:
- a pump configured to pressurize and output hydraulic fluid;
- an electric motor selectively driving the pump;
- an operator control including a first control associated with the first load circuit and a second control associated with the second load circuit;
- a controller configured to selectively control a target speed of the electric motor based on a position setting of the operator control regardless of a pressure generated by the pump;

a first proportional directional control valve in the first load circuit and communicating with the pump and the controller, the first proportional directional control valve controlling a flow of hydraulic fluid to a first hydraulic actuator associated with the first load circuit such that the flow of hydraulic fluid to the first hydraulic actuator is proportional to a first signal provided by the controller, the first signal being a function of a position of the first control of the operator control; and a second proportional directional control valve in the second load circuit and communicating with the pump and the controller, the second proportional directional control valve controlling a flow of hydraulic fluid to a second hydraulic actuator associated with the second load circuit such that the flow of hydraulic fluid to the second hydraulic actuator is proportional to a second signal provided by the controller, the second signal being a function of a position of the second control of the operator control, wherein the controller is configured to set the target speed of the electric motor as a maximum flow rate associated with whichever is the larger of: the position of the first control and the position of the second control.

2. The hydraulic system of claim 1, wherein control of the target speed of the electric motor by the controller is open-loop control.

3. The hydraulic system of claim 1, wherein the first load circuit is a bucket raise/lower circuit for a loader and the second load circuit is a bucket tilt circuit for a loader.

4. The hydraulic system of claim 1, wherein the first proportional directional control valve is actuated by a pair of proportional solenoids that receive the first signal from the controller to control a position of the first proportional directional control valve, and wherein the second proportional directional control valve is actuated by a pair of proportional solenoids that receive the second signal from the controller to control a position of the second proportional directional control valve.

5. The hydraulic system of claim 1, further comprising a first priority valve associated with the first proportional directional control valve and a second priority valve associated with the second proportional directional control valve, the first and second priority valves communicating with one another via a pilot pressure signal line.

6. The hydraulic system of claim 1, wherein the pump is a fixed displacement pump.

7. The hydraulic system of claim 1, wherein the first and second hydraulic actuators are hydraulic cylinders.

8. The hydraulic system of claim 1, wherein each of the first and second signals from the controller are pulse width modulated signals that are functions of a magnitude of the input from the operator control.

9. The hydraulic system of claim 1, further comprising a motor controller communicating with the motor, the motor controller receiving feedback from the motor such that the motor controller is configured to adjust an electric current provided to the motor to maintain the target speed even as load on the motor varies.

10. The hydraulic system of claim 1, wherein the target speed of the electric motor is a function of a magnitude of the input from the operator control.

11. A hydraulic system configured to provide a variable flow of hydraulic fluid to a load circuit, the hydraulic system comprising:

a pump configured to pressurize and output hydraulic fluid;

an electric motor selectively driving the pump;

a controller configured to selectively control a target speed of the electric motor based on input from an operator control regardless of a pressure generated by the pump;

a proportional directional control valve in the load circuit and communicating with the pump and the controller, the proportional directional control valve controlling a flow of hydraulic fluid to a hydraulic actuator associated with the load circuit such that the flow of hydraulic fluid to the hydraulic actuator is proportional to a signal provided by the controller, the signal being a function of the input from the operator control; and a motor controller communicating with the motor, the motor controller receiving feedback from the motor such that the motor controller is configured to adjust an electric current provided to the motor to maintain the target speed even as load on the motor varies, wherein flow of hydraulic fluid to the hydraulic actuator through the proportional directional control valve is varied by the controller making:

a) variations of the target speed of the motor; and b) variations of the signal to the proportional directional control valve.

12. The hydraulic system of claim 11, wherein control of the target speed of the electric motor by the controller is open-loop control.

13. The hydraulic system of claim 11, wherein the proportional directional control valve is actuated by a pair of proportional solenoids that receive the signal from the controller to control a position of the proportional directional control valve.

14. The hydraulic system of claim 11, wherein the pump is a fixed displacement pump.

15. The hydraulic system of claim 11, wherein the hydraulic actuator includes a hydraulic cylinder or a hydraulic motor.

16. The hydraulic system of claim 11, wherein each of the signal from the controller is a pulse width modulated signal that is a function of a magnitude of the input from the operator control.

17. The hydraulic system of claim 11, wherein the target speed of the electric motor is a function of a magnitude of the input from the operator control.

18. A stand-on loader comprising:

a frame, the frame supporting a platform configured to support an operator of the loader in an open space at a rear end of the stand-on loader;

a boom configured to raise or lower a load; and a bucket coupled to the boom for supporting the load;

a plurality of wheels or tracks coupled to the frame and configured to provide motive movement of the stand-on loader, the plurality of wheels or tracks defining a front rotational axis and a rear rotational axis; and a hydraulic system configured to provide a variable flow of hydraulic fluid to a boom raise/lower circuit and a bucket tilt circuit, the hydraulic system comprising:

a pump configured to pressurize and output hydraulic fluid;

an electric motor selectively driving the pump;

an operator control including a first control associated with the boom raise/lower circuit and a second control associated with the bucket tilt circuit;

a controller configured to selectively control a target speed of the electric motor based on a position setting of the operator control;

a first proportional directional control valve in the boom raise/lower circuit and communicating with the pump and the controller, the first proportional directional control valve controlling a flow of hydraulic fluid to a first hydraulic cylinder associated with the boom such that the flow of hydraulic fluid to the first hydraulic cylinder is proportional to a first signal provided by the controller, the first signal being a function of a position of the first control; and a second proportional directional control valve in the bucket tilt circuit and communicating with the pump and the controller, the second proportional directional control valve controlling a flow of hydraulic fluid to a second hydraulic cylinder associated with the bucket such that the flow of hydraulic fluid to the second hydraulic cylinder is proportional to a second signal provided by the controller, the second signal being a function of a position of the second control;

wherein at least a portion of the pump and at least a portion of the electric motor are positioned rearward of the rear rotational axis; and wherein control of the target speed of the electric motor by the controller is open-loop control in which the target speed of the motor is proportional to the position setting of the operator control regardless of a pressure generated by the pump.

19. The stand-on loader of claim 18, further comprising a first priority valve associated with the first proportional directional control valve and a second priority valve associated with the second proportional directional control valve, the first and second priority valves communicating with one another via a pilot pressure signal line to balance how much hydraulic fluid will be output through the first and second proportional directional control valves based on load demands on the hydraulic system.

* * * * *